United States Patent
Barbash

(10) Patent No.: US 11,238,582 B2
(45) Date of Patent: Feb. 1, 2022

(54) SYSTEM AND METHOD FOR MICROSCOPIC IMAGE PROCESSING AND DETERMINING MICROGLIA ACTIVATION STATE USING PROCESSED IMAGES

(71) Applicant: The Joan and Irwin Jacobs Technion-Cornell Institute, New York, NY (US)

(72) Inventor: Shahar Barbash, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 69 days.

(21) Appl. No.: 16/817,019

(22) Filed: Mar. 12, 2020

(65) Prior Publication Data

US 2020/0320690 A1 Oct. 8, 2020

Related U.S. Application Data

(60) Provisional application No. 62/827,972, filed on Apr. 2, 2019.

(51) Int. Cl.
*G06T 7/00* (2017.01)
*G06K 9/00* (2006.01)

(52) U.S. Cl.
CPC .......... *G06T 7/0012* (2013.01); *G06K 9/0014* (2013.01); *G06T 2207/10056* (2013.01); *G06T 2207/30016* (2013.01)

(58) Field of Classification Search
CPC ......... G06T 7/0012; G06T 2207/10056; G06T 2207/30016; G06K 9/0014
See application file for complete search history.

(56) References Cited

PUBLICATIONS

Kozlowski et al. "An Automated Method to Quantify Microglia Morphology and Application to Monitor Activation State Longitudinally In Vivo". PLoS One. vol. 7, 2. 2012. (Year: 2012).*

York et al. "3DMorph Automatic Analysis of Microglial Morphology in Three Dimensions from Ex Vivo and In Vivo Imaging". eNeuro. vol. 5,6. 2018. (Year: 2018).*

(Continued)

*Primary Examiner* — Vu Le
*Assistant Examiner* — Julius Chai
(74) *Attorney, Agent, or Firm* — M&B IP Analysts, LLC

(57) ABSTRACT

A method and system for preprocessing microscopic images. A method includes identifying a plurality of microglial cells shown in microglial cell channel images, wherein identifying the plurality of microglial cells further comprises quantizing the microglial cell channel microscopic images and filtering a plurality of objects in the quantized microglial cell channel microscopic images; identifying a soma and at least one projection for each of the plurality of microglial cells, wherein identifying the soma and the at least one projection for each microglial cell further includes iteratively removing pixels on the microglial cell as shown in one of the microglial cell channel images, wherein each soma and each projection has a respective size; and determining an activation state of each microglial cell based on the size of the soma and a total size of the at least one projection identified for the microglial cell.

17 Claims, 5 Drawing Sheets

(56) References Cited

PUBLICATIONS

Davis, et. al., "Characterizing Microglia Activation: a Spatial Statistics Approach to Maximize Information Extraction," Scientific Reports, 2017, London, pp. 2045-2322.

Kozlowski, et al., "An Automated Method to Quantify Microglia Morphology and Application to Monitor Activation State Longitudinally In Vivo," PLoS ONE, 2012, pp. 1-11.

* cited by examiner

SYSTEM AND METHOD FOR MICROSCOPIC IMAGE PROCESSING AND DETERMINING MICROGLIA ACTIVATION STATE USING PROCESSED IMAGES

CROSS-REFERENCE TO RELATED APPLICATIONS

This application claims the benefit of U.S. Provisional Application No. 62/827,972 filed on Apr. 2, 2019, the contents of which are hereby incorporated by reference.

TECHNICAL FIELD

The present disclosure relates generally to microscopic image processing, and more specifically to enhancing microscopic images used for determining microglia activation.

BACKGROUND

Due to developments in microscopy automation, large amounts of high-quality images are now collected for research and diagnostic purposes. However, analyzing these images to extract meaningful insights has become a research bottleneck. Specifically, the high number of images typically must be viewed individually by a researcher or doctor, who proceeds to make a subjective determination of microglia activation.

In particular, microscopic images may be used to view microglia. Microglia (individually referred to as a microglial cell) are glial cells in the brain and spinal cord. Microglia have high plasticity and can transform based on environmental needs. Specifically, in the brain, microglia search for damage, infectious agents, and amyloid-beta plaques. When a microglial cell identifies a plaque, the microglial cell is reactivated by undergoing a morphological change.

A microglial cell has a certain amount of plasma membrane that it uses to branch out and grow or retract projections. Retracting the projections increases the surface of the cell body (also known as soma) and vice versa.

During reactivation, the microglial cell retracts its projections and acquires a relatively spherical or amoeboid shape. The process of microglia reactivation is interrupted in patients having certain incurable diseases such as Alzheimer's disease, Prion disease, and Schizophrenia. As a result, microglia activation (or lack thereof) is of interest for diagnostic purposes. Additionally, researchers study the effects of different compounds on microglia activation.

Imaging techniques provide a minimally invasive tool for evaluating microglia activation. Specifically, due to the transformative property of microglia, activation state of microglia may be determined by observing the appearance of the microglia in microscopic images. However, this process requires the observer to make a subjective judgment of the extent to which the images demonstrate microglia activation. Additionally, existing solutions face challenges related to processing high numbers of images such that they are not suitable for large scale use.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for processing microscopic images. The method comprises: identifying a plurality of microglial cells shown in a plurality of microglial cell channel images, wherein identifying the plurality of microglial cells further comprises quantizing the plurality of microglial cell channel microscopic images and filtering a plurality of objects in the quantized plurality of microglial cell channel microscopic images; identifying a soma and at least one projection for each of the plurality of microglial cells, wherein identifying the soma and the at least one projection for each microglial cell further comprises iteratively removing pixels on the microglial cell as shown in one of the plurality of microglial cell channel images, wherein each soma and each projection has a respective size; and determining an activation state of each microglial cell based on the size of the soma and a total size of the at least one projection identified for the microglial cell.

Certain embodiments disclosed herein also include a non-transitory computer readable medium having stored thereon causing a processing circuitry to execute a process, the process comprising: identifying a plurality of microglial cells shown in a plurality of microglial cell channel images, wherein identifying the plurality of microglial cells further comprises quantizing the plurality of microglial cell channel microscopic images and filtering a plurality of objects in the quantized plurality of microglial cell channel microscopic images; identifying a soma and at least one projection for each of the plurality of microglial cells, wherein identifying the soma and the at least one projection for each microglial cell further comprises iteratively removing pixels on the microglial cell as shown in one of the plurality of microglial cell channel images, wherein each soma and each projection has a respective size; and determining an activation state of each microglial cell based on the size of the soma and a total size of the at least one projection identified for the microglial cell.

Certain embodiments disclosed herein also include a system for processing microscopic images. The system comprises: a processing circuitry; and a memory, the memory containing instructions that, when executed by the processing circuitry, configure the system to: identify a plurality of microglial cells shown in a plurality of microglial cell channel images, wherein identifying the plurality of microglial cells further comprises quantizing the plurality of microglial cell channel microscopic images and filtering a plurality of objects in the quantized plurality of microglial cell channel microscopic images; identify a soma and at least one projection for each of the plurality of microglial cells, wherein identifying the soma and the at least one projection for each microglial cell further comprises iteratively removing pixels on the microglial cell as shown in one of the plurality of microglial cell channel images, wherein each soma and each projection has a respective size; and determine an activation state of each microglial cell based on the size of the soma and a total size of the at least one projection identified for the microglial cell.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
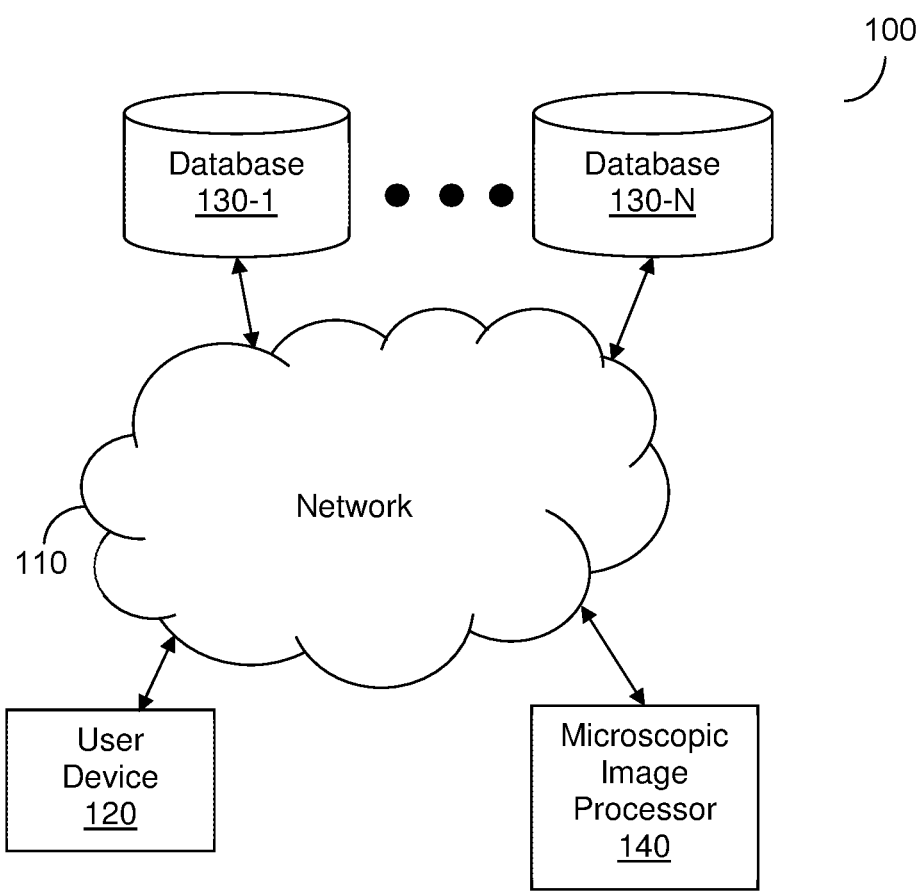
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that the relative size of the projections of a microglial cell in comparison to its soma provides a good estimate of the degree to which a cell is activated. To this end, the various disclosed embodiments provide techniques for processing images to increase suitability of the images for this comparison as well as for determining the activation state of microglia based on such processed images.

The comparison of sizes of projections to soma accounts for cells of different sizes since cells with the same total projection length may have different activation states based on the sizes of their respective somas. Thus, the disclosed embodiments include determining activation state that may be more accurate than consideration of the cell as a single object (e.g., by determining activation state based on either the soma size or projection length individually).

The various disclosed embodiments include a method and system for microscopic image processing and for determining microglia activation state based on processed microscopic images. The disclosed embodiments provide image processing techniques that improve images to be analyzed for activation state of microglial cells shown therein and, more specifically, allow for more efficient and accurate determination of microglia activation state than existing solutions. Further, the disclosed embodiments provide techniques for differentiating groups of microglia that are proximal to plaques from those that are not to allow for comparison of activation states between those groups.

Two overlapping microscopic images corresponding to two types of biological elements are received. The types of biological elements include microglial cells and protein aggregates, or plaques. These elements are stained with fluorescent dyes. The disclosed embodiments allow for processing microscopic images stained using any of these molecular stains. The microscopic images include microglia-specific stain images of a microglia signal-channel (appears below simply as 'channel') and amyloid-beta plaque-specific stain images of an amyloid-beta plaque signal-channel. The images may be preprocessed by filtering out noisy images (i.e., images demonstrating a measure of noise above a threshold). Contrast enhancement is performed on the images.

Potential microglia are identified in the microglia channel. Cell somas and projections are identified in the potential microglia. Objects may be filtered from among the potential microglia based on the identified soma size. For the remaining microglial cells, the ratio between the size of the soma and the size of the projections is calculated. The resulting ratio has a value representing a degree of activation such that higher values (i.e. large soma, short or few projections) tend to demonstrate an activated microglial cell while lower values (i.e. small soma, long or lots of projections) tend to demonstrate a non-activated microglial cell.

Amyloid-beta plaques are identified in the amyloid-beta plaque channel. Identifying the microglial cells and the amyloid-beta plaques include setting respective thresholds for each channel, quantizing the appropriate images, and filtering out objects that are not likely to be microglia or plaques, respectively.

Spatial correlations are determined for the identified microglia and plaques. In an example implementation, the spatial correlations include a distance between each activated microglia and the closest plaque, a distance between each non-activated microglia and the closest plaque, or both. Whether a microglial cell is activated or non-activated may be based on the ratio between cell soma size and projection size.

The image processing according to the disclosed embodiments allows for automating determination of microglia activation states based on images of microglia and amyloid-beta plaques while providing accuracy that is comparable to or better than manual scoring. Further, the activation state determination as described herein uses objective factors for analyzing images and calculating myelination that lead to higher consistency among results as compared to manual subjective estimations and calculations based thereon.

FIG. 1 shows an example network diagram 100 utilized to describe the various disclosed embodiments. In the example network diagram 100, a user device 120, a plurality of data sources 130-1 through 130-N (hereinafter referred to individually as a data source 130 and collectively as data sources 130, merely for simplicity purposes), and a microscopic image processor 140 are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device configured for receiving and displaying data such as images, microglia activation values, and the like. In various implementations, the user device 120 may be configured to display a graphical user interface (GUI) including the images, microglia activation values, and other information. The GUI may further allow for a user to interact with a displayed image using functions such as, but not limited to, zooming in, zooming out, dragging the image, looking at specific cells in a multi-cell image as well as their respective microglia activation values, manually adding scores for images (e.g., for comparison to myelination indices determined as described herein or otherwise for marking myelination indices based on the processed images), inputting experimental conditions for secondary statistical analysis based on the processed images, and the like.

The data sources may include, but are not limited to, databases or other sources of image data. The data sources 130 store microscopic images showing cells including microglia and amyloid-beta plaques. In an example implementation, the microscopic images may show microglia and amyloid-beta plaques stained using cell-specific molecular stains that aid in capturing microscopic details. The images may be overlapping images captured at different wavelengths. The microscopic images are received or retrieved from the data sources 130 by the microscopic image processor 140.

The microscopic image processor 140 is configured to process microscopic images showing stained microglia and amyloid-beta plaques as described therein. To this end, the microscopic image processor 140 is configured to, for example, preprocess the images (e.g., by filtering out noisy images and performing contrast enhancement), identify microglia, identify somas and projections, and determine activation state based on a ratio between total projection length and soma size.

The microscopic image processor 140 is also configured to identify amyloid-beta plaques in the microscopic images. Based on the identified amyloid-beta plaques and microglia as well as the respective activation state for each microglial cell, the microscopic image processor 140 may be further configured to determine a spatial correlation between activated microglia and plaques, between non-activated microglia and plaques, or both.

The microscopic image processor 140 may further be configured to send the processed microscopic images, the determined activation states, the determined spatial correlations, and the like, to the user device 120 for display.

In some implementations, the display may include displaying a user interface allowing for user interaction with the processed microscopic images. For example, the interactions may allow the user to zoom out, zoom in, drag the image, look at a specific cell, look at information for a specific cell (e.g., activation state, distance to nearest plaque, etc.), and output figures. The interactions may also or alternatively allow the user to input scores for microglia indicating an estimated activation state, thereby allowing for comparison with automatically determined activation states. The interactions may also or alternatively allow the user to input variations of experimental conditions for secondary statistical analysis.

In some implementations, the microscopic images may further be modified to visually distinguish between the soma and the projections of each microglial cell. As a non-limiting example, the projections may be colored red while the soma can be colored green.

It should be noted that a network 110 is shown as being used for communications merely as an example, but that the network 110 may be optional in various implementations. In particular, the microscopic image processor 140 may receive images to be processed from, for example, a local storage (not shown).

Figure 2:
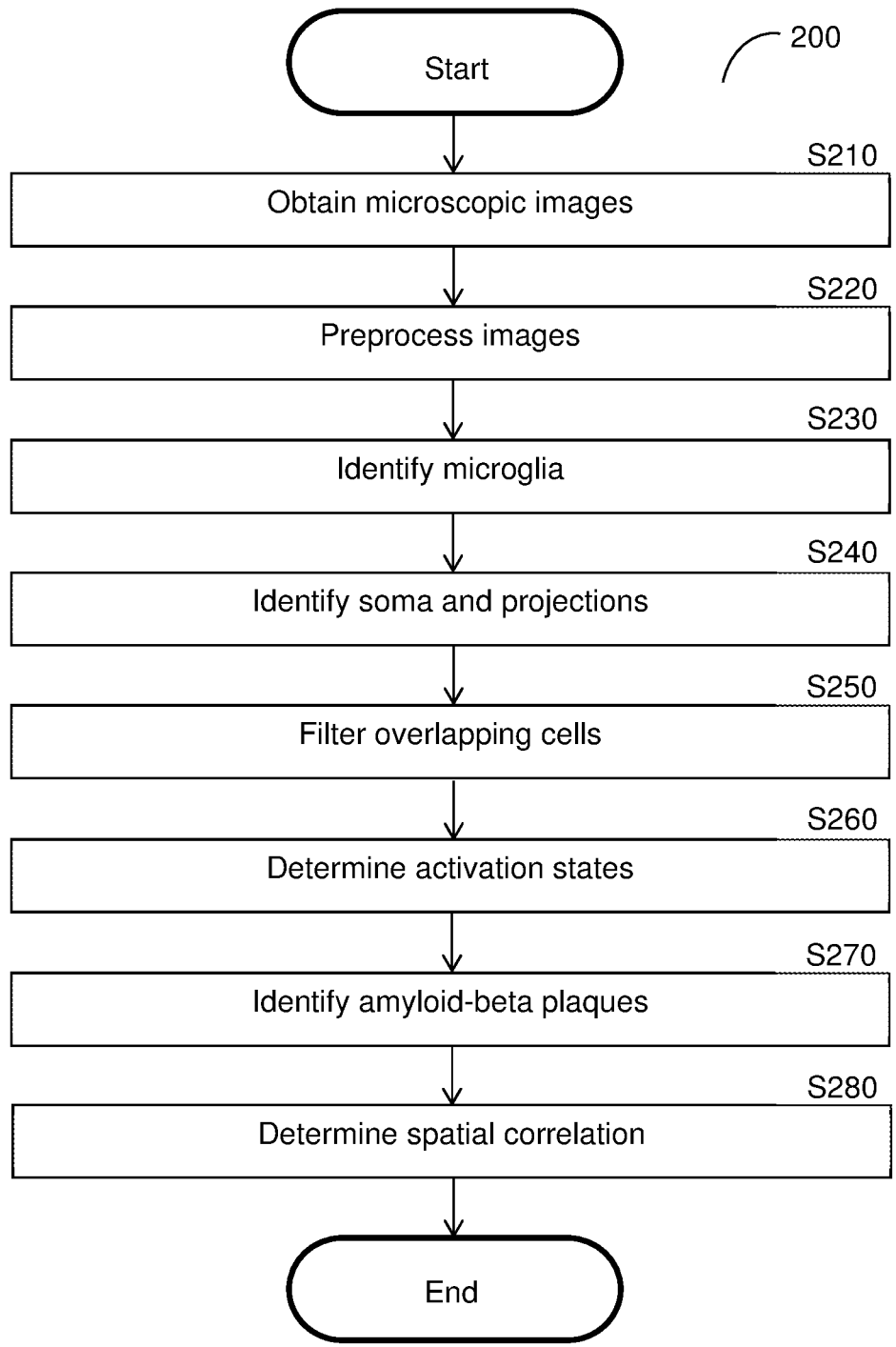
FIG. 2 is a flowchart illustrating a method for processing microscopic images according to an embodiment.

FIG. 2 is an example flowchart 200 illustrating a method for image processing and microglia activation state determination based thereon according to an embodiment. In an embodiment, the method is performed by the microscopic image processor 140. In another embodiment, at least a part of the method may be performed by another system. For example, microscopic images may be processed according to the method and sent to another system for microglia activation state determination, spatial correlation determination, or both.

At S210, microscopic images are obtained from one or more data sources. The microscopic images may be, for example, received or retrieved from one or more databases (e.g., the databases 130, FIG. 1).

The obtained microscopic images include images showing microglia and amyloid-beta plaques. Each of the microglia and the amyloid-beta plaques may be stained using a different molecule such that the stains used for microglia are visually distinct from the stains of amyloid-beta plaques. The fluorescent emission of each type of stain may be captured via a microscope as two channels. The stains are captured in the respective cells or plaques. Both the microglia and the amyloid-beta plaques are captured in the same microscope view such that they may overlap.

At optional S220, the images are preprocessed to improve accuracy of subsequent steps. In an embodiment, S220 includes removing noisy images, performing contrast enhancement, or both. The noise of each of the images may be measured, for example, using salt and pepper noise estimation. The contrast enhancement may include, for example, contrast-limited adaptive histogram equalization.

At S230, microglia are identified in the microscopic images of the microglia channel. In an embodiment, S230 includes quantizing the microscopic images of the microglia channel and filtering objects in the quantized microglia channel images based on size and relative dimensions. The remaining objects are identified as microglia. An example method that may be used to identify microglia in microscopic images is described further below with respect to FIG. 3.

At S240, soma and projections of the microglia are identified. In an embodiment, S240 includes iteratively removing pixels on the boundary of each object identified as a microglial cell and identifying the soma and projections based on the remaining pixels. The boundary pixels are removed such that the object does not lose its continuity. To this end, the number of iterations may be limited. In an example implementation, S240 includes 5 iterations of removing pixels.

Each projection may be identified as an object having a thickness less than or equal to a threshold number of pixels (e.g., one pixel). A remaining spherical or sphere-like shape (i.e., other than the identified projections) is identified as a soma.

At optional S250, microglia may be filtered out based on the identified soma. In an embodiment, S250 includes filtering out microglia for which more than one soma is identified. Identification of multiple somas for a microglial cell may be caused by overlapping cells or an unusually thick projection, either of which is not representative of the actual cell. Accordingly, filtering out microglia having these overlapping or unusually thick somas increases the accuracy of subsequent determinations.

At S260, an activation state of each remaining microglial cell is determined. In an embodiment, the activation state is determined based on relative sizes of the identified soma and projections. More specifically, S260 includes calculating a ratio between an area of the soma and a total length of the projections. The resulting value of the ratio represents a degree to which the microglial cell is activated. In an example implementation, a microglial cell having a ratio less than a threshold is determined to be non-activated and a microglial cell having a ratio greater than a threshold is determined to be activated. The result when the ratio is equal to the threshold may be either activated or non-activated and may be predetermined. The area of the soma of each microglial cell is determined as the area within a boundary of the soma.

The determined activation state for each microglial cell may be expressed as a value (e.g., a value of the ratio between soma area and projection length) or may be expressed as a classification. To this end, in an embodiment, S260 may further include determining the activation state based on the calculated ratio. In an example implementation, activation states include activated or non-activated, and may further include partially activated. Whether a cell is activated may be determined using one or more metrics. The metrics may be absolute metrics (e.g., one or more thresholds for ratio values) or relative metrics (e.g., based on distributions of ratios among different cells).

Example metrics for determining activation state follow. It should be noted that these metrics are not necessarily limiting, and that in at least some embodiments, different metrics may be used. Further, although cells may be classified as either activated or non-activated when they show high activation or low activation, respectively, it should be noted that the biological process of activation is not binary. As a result, any classification as either activated or non-activated is performed solely for purposes of aiding subsequent processing requiring strict classification (e.g., to compare cells having high activation rates to those having low activation rates, to label images or portions thereof with relative activation states, etc.). In at least some implementations, the ratio itself or a classification indicating a relative degree of activation may be utilized instead.

A first metric may be based on absolute threshold values. Specifically, an upper threshold and a lower threshold may be used, with ratios above the upper threshold indicating that a cell is activated and ratios below the lower threshold indicating that a cell is non-activated. The thresholds may be the same or different. Cells having ratios between the upper and lower thresholds may be classified as partially activated, indeterminate, or may be excluded from subsequent processing (e.g., processing which requires classification of the cell as either activated or non-activated). As a non-limiting example, the lower threshold may be 8 and the upper threshold may be 20 such that cells having a ratio below 8 are non-activated and cells having a ratio above 20 are activated. In this regard, it has been identified that microglial cells in humans having high activation rates typically demonstrate the ratio described above having a value over 20 and microglial cells having low activation rates typically demonstrate the ratio described above having a value below 8. Other thresholds may be utilized without departing from the scope of the disclosed embodiments.

A second metric may be based on distributions among different cells. More specifically, ratio values of different cells may be utilized to determine a mean and standard deviation or percentiles. With respect to mean and standard deviation, cells having ratios above the mean plus a multiple of the standard deviation may be determined as activated and cells having ratios below the mean minus a multiple of the standard deviation may be determined as non-activated. With respect to percentiles, cells having ratios above an upper percentile may be activated and cells having ratios below a lower percentile may be non-activated. The distributions may be based on cells in different groups such as, but not limited to, cells shown in different images, cells in different brain regions, cells having different distances to plaques, cells subject to different experimental conditions, and the like. This allows for relative comparisons of activation states.

Figure 5A:
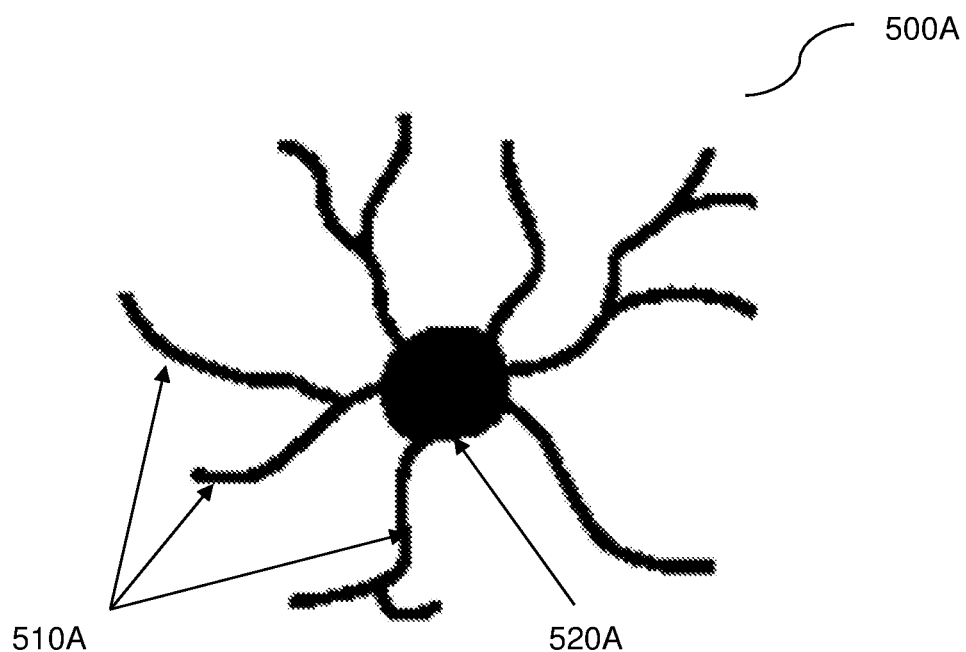
FIGS. 5A-B are example images showing microglia.
Figure 5B:
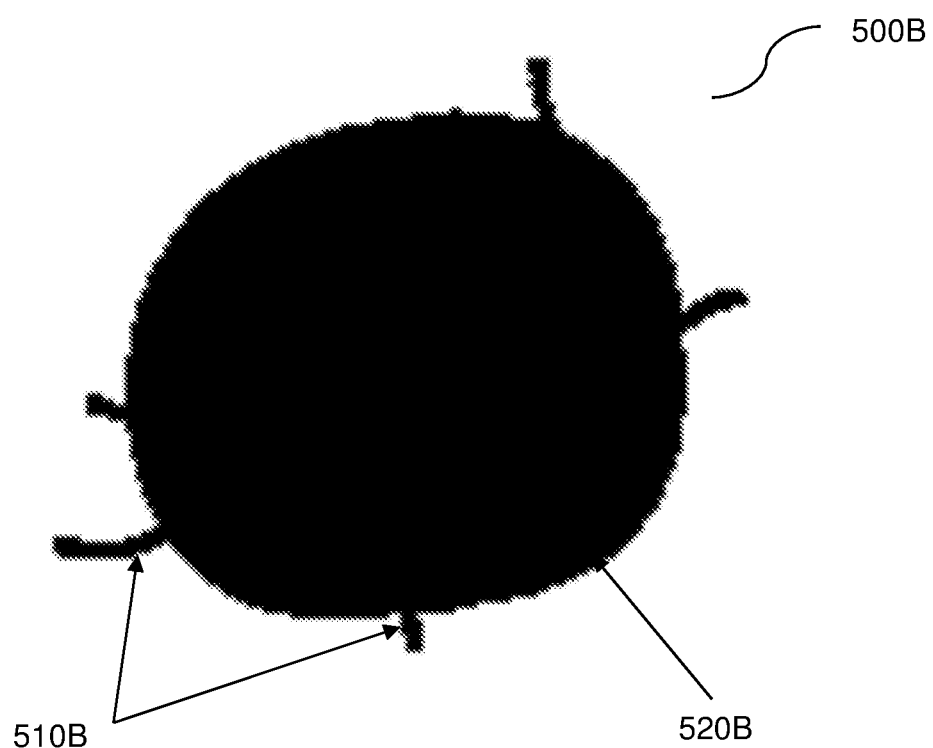

Example portions of images showing a non-activated microglial cell 500A and an activated microglial cell 500B are shown in FIGS. 5A and 5B, respectively. The microglial cell 500A has projections 510A and a soma 520A. The area of the soma relative to the total length of the projections may be ¼ such that the value representing the degree of activation calculated for the microglial cell 500A is 0.25. The microglial cell 500B has projections 510B and a soma 520B. The area of the soma relative to the total length of the projections may be 4/1 such that the value representing the degree of activation calculated for the microglial cell 500B is 4. In an example implementation, the threshold for activation is 1 such that the microglial cell 500A is determined to be non-activated and the microglial cell 500B is determined to be activated.

At optional S270, amyloid-beta plaques are identified in the microscopic images of the amyloid-beta plaque channel. In an embodiment, S270 includes quantizing the microscopic images of the amyloid-beta plaque channel and filtering objects in the quantized amyloid-beta plaque channel images based on size and relative dimensions. In a further embodiment, the quantization includes transforming an intensity image into a binary image. The remaining objects are identified as amyloid-beta plaques. An example method that may be used to identify amyloid-beta plaques in microscopic images is described further below with respect to FIG. 3.

At optional S280, one or more spatial correlations between microglia and plaques may be determined and the microglia may be classified with respect to distance to plaques. In an embodiment, S280 includes determining a closest plaque for each microglial cell among the identified plaques and microglia. A distance from each microglial cell to its closest plaque is calculated based on the microscopic images. Based on the determined distances, each microglial cell may be classified as having a proximal plaque or a distal plaque (e.g., based on a threshold distance). This allows for comparison of activation state between the groups of proximal microglia and distal microglia.

It should be noted that the steps are shown in a particular order in FIG. 2 merely for example purposes, and that at least some steps may be in a different order without departing from the scope of the disclosed embodiments. In particular, amyloid-beta plaques may be identified before or after microglia are identified.

Figure 3:
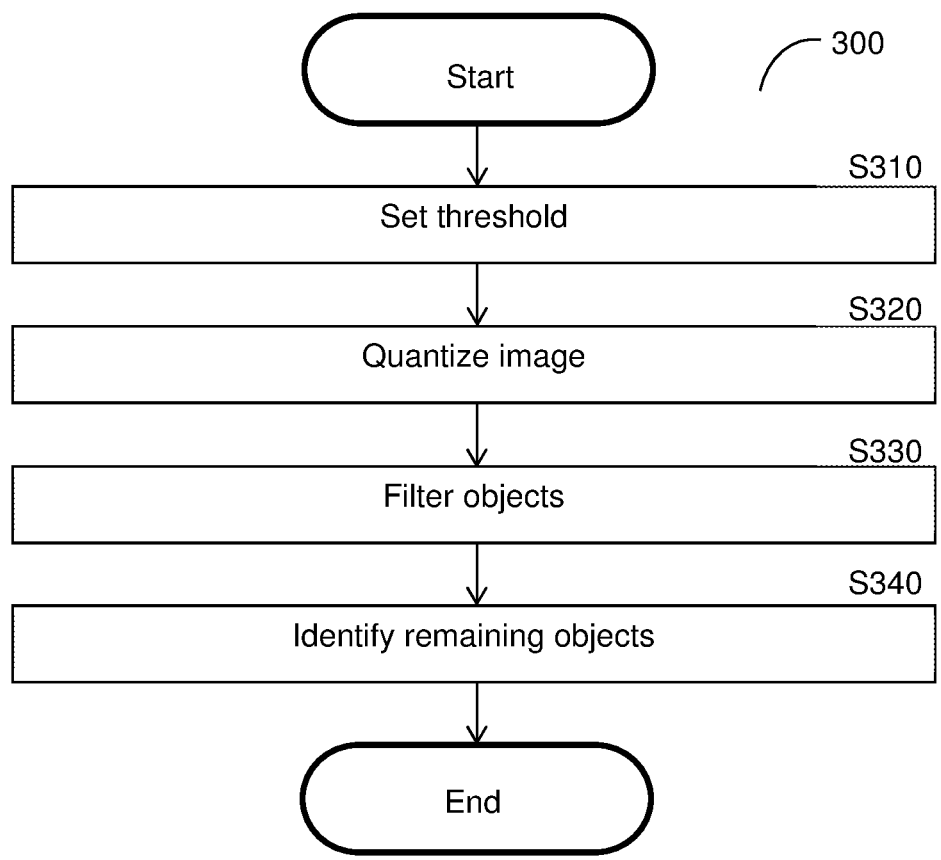
FIG. 3 is a flowchart illustrating a method for identifying microglial cells or amyloid-beta plaques using filtering according to an embodiment.

FIG. 3 is an example flowchart 300 illustrating a method for identifying microglial cells or amyloid-beta plaques using filtering on a microscopic image according to an embodiment. In an embodiment, the method may be performed by the microscopic image processor 140. The method may be repeated for multiple microscopic images.

At S310, a threshold to be used for image quantization is set. In an example implementation, threshold is determined such that quantizing a microscopic image will convert the microscopic image to a binary image.

The threshold may be set using a thresholding technique such as, but not limited to, Otsu's method for clustering-based image thresholding. To this end, S310 may include iterating through all possible threshold values and calculating measures of spread of the pixels. Based on the calculated measures of spread, an optimum threshold that minimizes combined spread is determined. Further, the thresholding technique may assume that pixels belong to one of two classes: foreground or background.

At S320, the microscopic image is quantized based on the threshold. In an embodiment, S320 includes converting an intensity image into a binary image. To this end, S320 may include comparing pixel intensity values to the determined threshold. Pixels having an intensity above the threshold are classified as a first binary value and pixels having an intensity below the threshold are classified as a second binary value. In an example implementation, the different binary values correspond to white and black colors.

At S330, objects in the quantized microscopic image are filtered. In an embodiment, S330 includes filtering objects based on total size (e.g., area), relative dimensions (e.g., length as compared to width), or both.

In an embodiment, filtering the objects based on size includes determining a distribution of object sizes and filtering out objects above a threshold, below a threshold, or both (i.e., above a first threshold and below a second threshold). In an example implementation, objects having an area in the bottom $10^{th}$ percentile of the distribution of object sizes and objects having an area in the top $20^{th}$ percentile of the distribution of object sizes are filtered out. It should be noted that other percentiles may be utilized without departing from the disclosed embodiments.

In this regard, it has been identified that, in accordance with the disclosed embodiments, objects having size less than the $10^{th}$ (tenth) percentile of size are typically artifacts and objects having size greater than the $80^{th}$ (eightieth) percentile of size are typically cell aggregates. Such artifacts and cell aggregates are not needed for activation state determination as described herein and, in contrast, may result in misleading or otherwise inaccurate determinations of activation state. Accordingly, objects that are likely artifacts or cell aggregates may be filtered out in order to increase the accuracy of later steps. To this end, in an example implementation, the filtered objects include objects having size less than the $10^{th}$ percentile of size or greater than the $80^{th}$ percentile of size. In an embodiment, when microglia are to be identified, the filtering also includes filtering out long objects. An object is long when one of its dimensions is much greater than the other, i.e., when a major axis of the object is at least multiple times larger than a minor axis. In an example implementation, the long objects include objects having a major axis with a length that is at least 3 times the length of a minor axis of the object.

At S340, the remaining objects are identified as the microglia or amyloid-beta plaques. Specifically, when the microscopic image was an image of the microglia channel, the remaining objects are identified as microglia. When the microscopic image was an image of the amyloid-beta plaque channel, the remaining objects are identified as amyloid-beta plaques.

Figure 4:
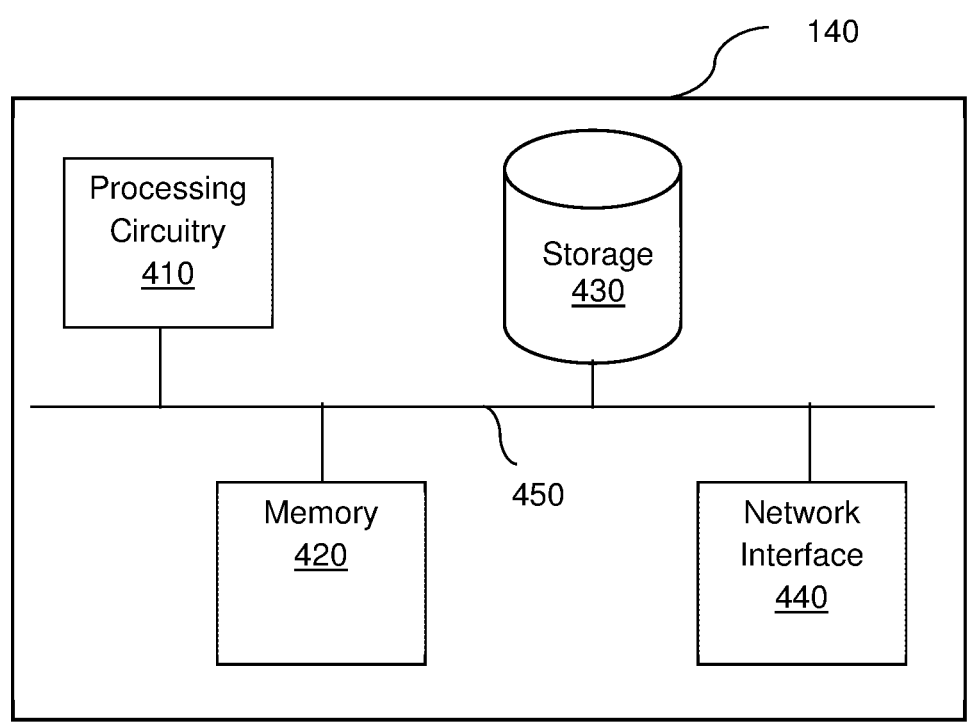
FIG. 4 is a schematic diagram of a microscopic image processor according to an embodiment.

FIG. 4 is an example schematic diagram of a microscopic image processor 140 according to an embodiment. The microscopic image processor 140 includes a processing circuitry 410 coupled to a memory 420, a storage 430, and a network interface 440. In an embodiment, the components of the microscopic image processor 140 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein. Specifically, the instructions, when executed, cause the processing circuitry 410 to generate fleet behavior models and detect anomalous behavior in fleets or sub-fleets as described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the microscopic image processor 140 to communicate with the database 140 for the purpose of, for example, retrieving microscopic images for processing. Further, the network interface 440 allows the microscopic image processor 140 to communicate with the user device 120 for the purpose of sending processed images, values representing microglia activation states, both, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for processing microscopic images, comprising:
    identifying a plurality of microglial cells shown in a plurality of microglial cell channel images, wherein identifying the plurality of microglial cells further comprises quantizing the plurality of microglial cell channel images and filtering a plurality of objects in the quantized plurality of microglial cell channel images;
    identifying a soma and at least one projection for each of the plurality of microglial cells, wherein identifying the soma and the at least one projection for each microglial cell further comprises iteratively removing pixels on the microglial cell as shown in one of the plurality of microglial cell channel images, wherein each soma and each projection has a respective size, wherein each soma has an area, wherein each projection has a length; and
    determining an activation state of each microglial cell based on the size of the soma and a total size of the at least one projection identified for the microglial cell, wherein determining the activation state further comprises calculating a ratio between the area of the soma and a total length of the at least one projection identified for the microglial cell, wherein the activation state is determined based on the calculated ratio.

2. The method of claim 1, further comprising:
    comparing the calculated ratio for each microglial cell to at least one threshold, wherein the activation state of each microglial cell is determined based on the comparison.

3. The method of claim 1, wherein each projection is an object shown in one of the plurality of microglial cell channel images having a thickness below a thickness threshold.

4. The method of claim 1, wherein the filtered objects include at least one object having a size below a low size threshold and at least one object having a size above a high size threshold.

5. The method of claim 4, wherein the low size threshold is the tenth percentile of sizes among the plurality of objects.

6. The method of claim 4, wherein the high size threshold is the eightieth percentile of sizes among the plurality of objects.

7. The method of claim 1, further comprising:
    determining a spatial correlation between each of the plurality of microglial cells and a respective plaque of a plurality of plaques shown in a plurality of amyloid-beta plaque channel images, wherein each spatial correlation is determined based on a distance between one of the plurality of microglial cells and its closest plaque of the plurality of plaques.

8. The method of claim 7, further comprising:
    identifying the plurality of plaques in the plurality of amyloid-beta plaque channel images, wherein identifying the plurality of plaques further comprises quantizing the plurality of amyloid-beta plaque channel images and filtering a plurality of objects in the quantized plurality of amyloid-beta plaque channel images.

9. A non-transitory computer readable medium having stored thereon instructions for causing a processing circuitry to execute a process, the process comprising:
    identifying a plurality of microglial cells shown in a plurality of microglial cell channel images, wherein identifying the plurality of microglial cells further comprises quantizing the plurality of microglial cell channel images and filtering a plurality of objects in the quantized plurality of microglial cell channel images;
    identifying a soma and at least one projection for each of the plurality of microglial cells, wherein identifying the soma and the at least one projection for each microglial cell further comprises iteratively removing pixels on the microglial cell as shown in one of the plurality of microglial cell channel images, wherein each soma and each projection has a respective size, wherein each soma has an area, wherein each projection has a length; and
    determining an activation state of each microglial cell based on the size of the soma and a total size of the at least one projection identified for the microglial cell, wherein determining the activation state further comprises calculating a ratio between the area of the soma and a total length of the at least one projection identified for the microglial cell, wherein the activation state is determined based on the calculated ratio.

10. A system for processing microscopic images, comprising:
    a processing circuitry; and
    a memory, the memory containing instructions that, when executed by the processing circuitry, configure the system to:
    identify a plurality of microglial cells shown in a plurality of microglial cell channel images, wherein identifying the plurality of microglial cells further comprises quantizing the plurality of microglial cell channel images and filtering a plurality of objects in the quantized plurality of microglial cell channel images;
    identify a soma and at least one projection for each of the plurality of microglial cells, wherein identifying the soma and the at least one projection for each microglial cell further comprises iteratively removing pixels on the microglial cell as shown in one of the plurality of microglial cell channel images, wherein each soma and each projection has a respective size, wherein each soma has an area, wherein each projection has a length; and determine an activation state of each microglial cell based on the size of the soma and a total size of the at least one projection identified for the microglial cell, wherein the system is further configured to calculate a ratio between the area of the soma and a total length of the at least one projection identified for the microglial cell, wherein the activation state is determined based on the calculated ratio.

11. The system of claim 10, wherein the system is further configured to:
compare the calculated ratio for each microglial cell to at least one threshold, wherein the activation state of each microglial cell is determined based on the comparison.

12. The system of claim 10, wherein each projection is an object shown in one of the plurality of microglial cell channel images having a thickness below a thickness threshold.

13. The system of claim 10, wherein the filtered objects include at least one object having a size below a low size threshold and at least one object having a size above a high size threshold.

14. The system of claim 13, wherein the low size threshold is the tenth percentile of sizes among the plurality of objects.

15. The system of claim 13, wherein the high size threshold is the eightieth percentile of sizes among the plurality of objects.

16. The system of claim 10, wherein the system is further configured to:
determine a spatial correlation between each of the plurality of microglial cells and a respective plaque of a plurality of plaques shown in a plurality of amyloid-beta plaque channel images, wherein each spatial correlation is determined based on a distance between one of the plurality of microglial cells and its closest plaque of the plurality of plaques.

17. The system of claim 16, wherein the system is further configured to:
identify the plurality of plaques in the plurality of amyloid-beta plaque channel images, wherein identifying the plurality of plaques further comprises quantizing the plurality of amyloid-beta plaque channel images and filtering a plurality of objects in the quantized plurality of amyloid-beta plaque channel images.

* * * * *